United States Patent
Wu et al.

(10) Patent No.: US 8,622,677 B2
(45) Date of Patent: Jan. 7, 2014

(54) SEMI-TRAILER SUPPORT LOADING NUT

(75) Inventors: Zhiqiang Wu, Foshan (CN); Shaofan Zeng, Foshan (CN); Xiangyong Zhong, Foshan (CN)

(73) Assignee: Guangdong Fuwa Engineering Manufacturing Co., Ltd., Foshan (CN)

( * ) Notice: Subject to any disclaimer, the term of this patent is extended or adjusted under 35 U.S.C. 154(b) by 578 days.

(21) Appl. No.: 12/744,153

(22) PCT Filed: May 23, 2008

(86) PCT No.: PCT/CN2008/001010
§ 371 (c)(1),
(2), (4) Date: Aug. 24, 2010

(87) PCT Pub. No.: WO2009/065288
PCT Pub. Date: May 28, 2009

(65) Prior Publication Data
US 2011/0188968 A1 Aug. 4, 2011

(30) Foreign Application Priority Data

Nov. 21, 2007 (CN) .......................... 2007 1 0031674
Nov. 21, 2007 (CN) .......................... 2007 2 0060046 U
Apr. 29, 2008 (CN) .......................... 2008 1 0027848

(51) Int. Cl.
*F16B 37/00* (2006.01)

(52) U.S. Cl.
USPC ............................. 411/427; 411/428; 411/546

(58) Field of Classification Search
USPC ........................ 411/427, 428, 432, 542, 546
See application file for complete search history.

(56) References Cited

U.S. PATENT DOCUMENTS

| | | | |
|---|---|---|---|
| 1,062,015 A * | 5/1913 | Lane | 285/139.1 |
| 1,309,616 A * | 7/1919 | Eisler | 411/427 |
| 2,518,468 A * | 8/1950 | Harding | 411/269 |
| 2,632,355 A * | 3/1953 | Becker | 411/427 |
| 2,672,659 A * | 3/1954 | Becker | 403/20 |
| 2,826,631 A * | 3/1958 | Rohe | 174/138 R |
| 3,390,906 A * | 7/1968 | Wing | 403/11 |
| 3,399,589 A * | 9/1968 | Breed | 411/428 |
| 3,504,723 A * | 4/1970 | Cushman et al. | 411/82.1 |
| 3,878,598 A * | 4/1975 | Steward | 29/432.2 |

(Continued)

FOREIGN PATENT DOCUMENTS

| | | |
|---|---|---|
| CN | 101168363 A | 4/2008 |
| EP | 1332936 A2 | 8/2003 |

*Primary Examiner* — Roberta Delisle
(74) *Attorney, Agent, or Firm* — Baker & Hostetler LLP

(57) ABSTRACT

A semi-trailer leg loading nut includes a screwed hole provided on a nut column and connecting two ends of the nut. Said nut is a two-layered structure formed of a top layer and an under layer or a three-layered structure formed of a top layer, an intermediate layer and an under layer. The outer outline of at least two layers of the nut is a square with the same cutting angle. The side length of the two layers of squares is equal. The outer outline projection of the two layers of squares overlap with each other along the column axis direction. The outer outline projection of the other layer is within the overlapped projection of the two layers along the column axis direction. A funneled oil cup or an oil groove is provided on the top layer of the nut and communicates with the screwed hole. A bottom of the under layer of the nut is plane and is pressed on a loading plate in a quadrate pipe to transfer load.

7 Claims, 4 Drawing Sheets

(56) References Cited

U.S. PATENT DOCUMENTS

| | | |
|---|---|---|
| 4,205,824 A | 6/1980 | Mai |
| 4,472,095 A * | 9/1984 | Molina .................. 411/304 |
| 4,759,237 A * | 7/1988 | Fauchet et al. ............. 81/53.2 |
| 4,770,584 A * | 9/1988 | Vinciguerra ............... 411/389 |
| 5,090,854 A * | 2/1992 | Hafeli et al. ............... 411/186 |
| 5,098,765 A * | 3/1992 | Bien ........................ 428/134 |
| 5,813,185 A * | 9/1998 | Jackson ..................... 52/562 |
| 7,241,097 B2 | 7/2007 | Dembowsky et al. |
| 2002/0012578 A1* | 1/2002 | Duran et al. .............. 411/427 |
| 2005/0134069 A1 | 6/2005 | Odulio et al. |

* cited by examiner

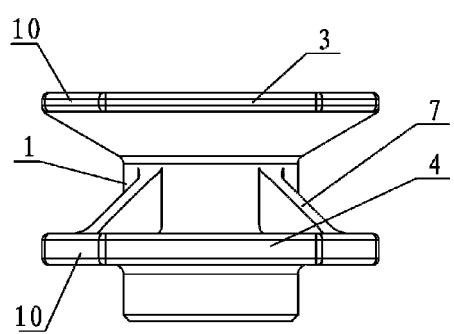
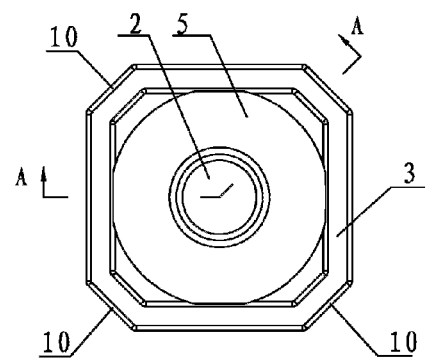
FIG. 1  FIG. 2
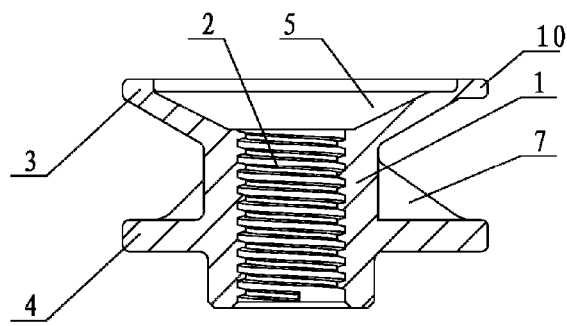
FIG. 3
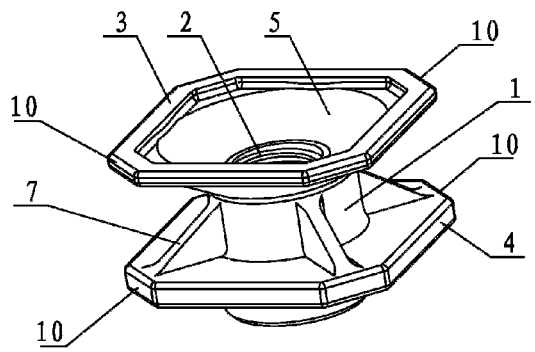
FIG. 4

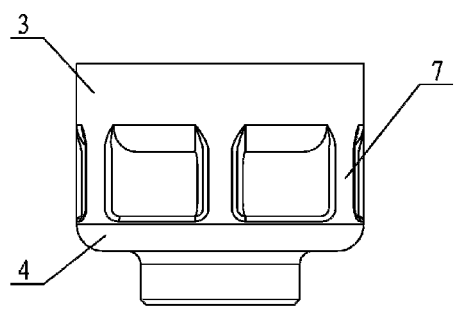
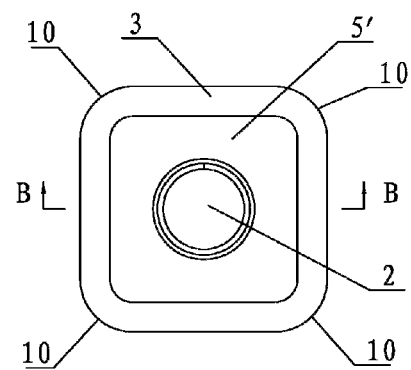
FIG. 6        FIG. 7
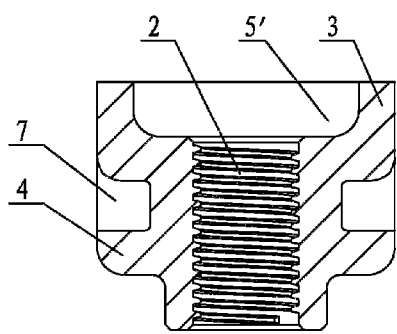
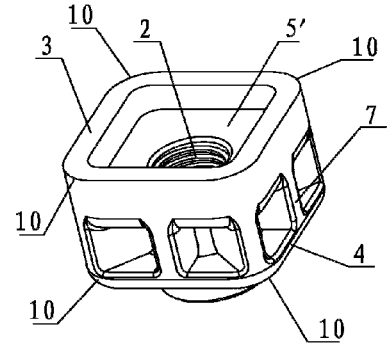
FIG. 8        FIG. 9

SEMI-TRAILER SUPPORT LOADING NUT

TECHNICAL FIELD

This invention relates to a semi-trailer leg loading nut, particularly to a loading nut to be matched with a screw for adjusting the lifting of a semi-trailer leg.

BACKGROUND TECHNOLOGY

The outside of left and right edge beams of the front part of a semi-trailer are usually equipped with a lifting leg to support the weight of the front part of the semi-trailer, to adjust the height of the front part of the semi-trailer and to adapt the inserting or withdrawing of the fifth wheel. When the semi-trailer is pulled to travel, inner legs retract to leave the ground so as to keep a safe distance.

A semi-trailer landing gear (leg) includes: outer legs mounted at the left and right sides of the front part of the semi-trailer, inner legs which extend and retract upwards and downwards in the outer legs, a screw and nut assembly which connects the inner and outer legs and transfers load, a two-speed gear transmission, a crank and a central shaft for connecting the left and right legs. In order to ensure the quality of the leg, except for optimizing the manufacturing process of the product to ensure the concentricity between the centerline of the outer legs and the center hole of the bearing cushion, between the centerline of the inner legs and the center hole of the loading plate, it is also important to optimize the design of the screw-nut which transfer load.

Traditional designs for a screw nut adopt a spherical nut, a two-side semicircle bossed nut or a hanging groove nut, etc. These kinds of nuts have their own features and all of them can fine-tune the concentricity between the axes of the screw and the nut. For example, the present applicant used a similar nut in the Chinese patent application No. 99236524.4 (with the title of "A Semi-trailer Landing Gear") and obtained a Chinese utility model patent No. 200520064422.1 with the title of "A Screw-Nut for a Semi-trailer Landing Gear" for a similar nut. However, all of these nuts are single-layered. When the screw rotates, only angles of a single layer of the nut contact the inner wall of a quadrate pipe and the other portion of the nut hangs, and thus the nut under the rotating torque cannot be kept stable. Thus, the lifting capability of the leg is reduced, effectively meshed threads of the screw and the nut reduced and the moment and the shear of the threads increased. According to American standards AAR, experiments show that vibration can easily occur and loud noise is generated (80-85 db); the threads can easily deform, even the screw and the nut are stuck, causing failure of the experiment (the failure chance is 20%-25% or even higher). Years of practice proves that the threads of traditional nuts are easy to deform in application, or even the screw and the nut are stuck. As a result, rotation becomes difficult and service time of the screw and the nut is affected.

SUMMARY OF THE INVENTION

The objective of this invention is to overcome the defects of the prior technology and to provide a semi-trailer leg loading nut with a reasonable structure, stable performance, good lifting capability, flexible operation in full load, a lower manufacturing cost and a longer service time.

The objective of this invention is realized by providing a semi-trailer leg loading nut comprising a screwed hole provided on a nut column and connecting two ends of the nut, the nut being characterized in that: the nut is a two-layered structure formed of a top layer and an under layer or a three-layered structure formed of a top layer, an intermediate layer and an under layer; the nut has at least two layers of outer outline which both are squares having the same cutting angle; the side length of the two layers of squares is the same; the projection of the outer outlines of the two layers of squares overlap with each other in the column axis direction; the projection of the outer outline of the other layer is within the overlapped projection of the two layers along the column axis direction;

Wherein a funneled oil cup or an oil groove which is communication with the screwed hole is provided to the top layer of the nut;

Wherein a bottom of the under layer of the nut is plane and pressed on a loading plate in a quadrate pipe to transfer load;

Wherein reinforcing ribs are provided between the column and the under layer of the nut;

Wherein the reinforcing ribs are triangles with one side connected to the column and the other side to the under layer;

Wherein the reinforcing ribs are quadrilateral with the top side of the quadrilateral connected to the toper layer or the intermediate layer, the bottom side to the under layer and one lateral side to the column; and Wherein the cutting angles are straight cutting angles or arc cutting angles.

The advantageous effects of this invention over a semi-trailer leg loading nut of the prior technology are:

The nut of this invention is designed into a square structure having a top layer and an under layer, or a top layer, an intermediate layer and an under layer. The nut has at least two layers whose outer outlines are square having the same cutting angle. The side length of the two layers of squares is the same; the projection of the outer outlines of the two layers of squares overlap with each other in the column axis direction. The projection of the outer outline of the other layer is within the overlapped projection of the two layers along the column axis direction. When the screw rotates, at least five or six angles of the 8 angles of the two layers whose projection overlaps with each other of the nut are in contact with an inner wall of a quadrate pipe simultaneously, thereby increasing the anti-rotating moment capability of the nut. The top layer of the nut is provided with a funneled oil cup or an oil groove. A bottom of the under layer of the nut is plane and is pressed on the loading plate plane for transferring load. When being lifted with heavy load, the nut is kept stable. Thus the lifting capability of the leg is improved, while no vibration and almost no noise are generated. There are many effectively meshed threads of the screw and the nut. Thus, the force applied to the threads are even; the actual stress is low; little wear is caused and operation flexibility under full load is obtained. At the same time, as reinforcing ribs are provided between the top and under layers or the under and intermediate layers of the nut, the weight of the nut is effectively reduced while the good strength and stiffness of the nut are obtained, thereby extending the service life of the product. According to American standards AAR, experiments show that the nut of this invention can work stably without vibration and substantially without noise (50-60 db, according to the experiments); the lifting capability of the leg is improved by about 15%-20% without deformation of threads and substantially without wear. After the experiments, the screw can rotate freely in the nut. Both the screw and the nut have successfully endured the AAR experiments.

BRIEF DESCRIPTION OF THE DRAWINGS

FIG. 1 is a schematic front view of the best example of this invention.

FIG. 2 is a top view of FIG. 1.

FIG. 3 is a cut-away view of FIG. 2 in the A-A direction.

FIG. 4 is a perspective view of the best example of this invention.

FIG. 6 is a front view of another example of this invention.

FIG. 7 is a top view of FIG. 6.

FIG. 8 is a cut-away view of FIG. 7 in the B-B direction.

FIG. 9 is a perspective view of the example in FIG. 6.

Figure 5:
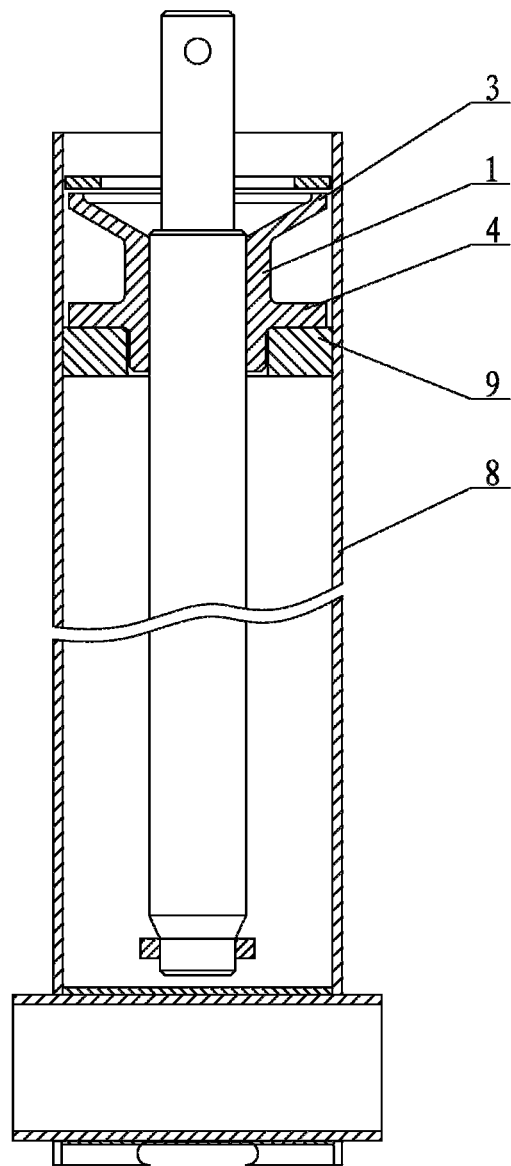
FIG. 5 is a cut-away view of the best example of this invention in the application state.

1. Column
2. Screwed hole
3. Top layer
4. Under layer
5. Funneled oil cup
5'. Oil groove
6. Intermediate layer
7. Reinforcing rib
8. Quadrate pipe
9. Loading plate
10. Cutting angle

DETAILED DESCRIPTION OF THE INVENTION

The followings further describe this invention with reference to the figures.

EXAMPLE 1

With reference to FIGS. 1-5, this example is the best one of the semi-trailer leg loading nut comprising: a screwed hole 2 provided on a nut column 1 and connecting two ends of the nut. The nut is a two-layered structure formed of a top layer 3 and an under layer 4. Both of the two layers are squares having the same cutting angle 10. The side length of the two layers of squares is the same. The projection of the outer outlines of the two layers of squares overlap with each other in the column 1 axis direction. The cutting angle 10 of the squares is a straight cutting angle so as to be away from the circular angle positions of the square quadrate pipe 8. When the screw rotates, at least five or six angles of the 8 angles of the two-layered square nut are in contact with an inner wall of the quadrate pipe 8 simultaneously, thereby increasing the anti-rotating moment capability of the nut.

The top layer 3 of the nut is provided with a funneled oil cup 5 which is in communication with the screwed hole 2. When the nut works, the lubricating grease in the funneled oil cup 5 is brought to the thread movement pairs along with the rotation of the screw, thereby effectively reducing the friction and allowing flexible transmission between the screw and the nut.

The bottom of the under layer 4 of the nut is plane and is pressed on a loading plate 9 in the quadrate pipe 8 to transfer load. The lower end of the column 1 extends to the center hole of the loading plate 9. Thus the length of the column 1 is increased. Even if the distance between the top and under layers is short, enough meshed threads of the nut for bearing load can be guaranteed.

Reinforcing ribs 7 are provided between the top layer 3 and the under layer 4 of the nut. The reinforcing rib 7 in this example is triangular with one side connected to the column 1 and another side connected to the under layer 4, thereby effectively reducing the weight of the nut and maintaining the strength and stiffness of the nut. There are four reinforcing ribs 7 evenly distributed in the ring direction and facing the four cutting angles of the square.

EXAMPLE 2

With reference to FIGS. 6-9, this example is another one of the semi-trailer leg loading nut having substantially the same structure as Example 1 which is omitted here. The slight differences between the two examples are as below:

The four cutting angles of the top layer 3 and the under layer 4 of the nut are arc cutting angles and are away from the circular angle positions of the square quadrate pipe 8 too.

Between the top layer 3 and the under layer 4 there are eight reinforcing ribs 7 which are quadrilateral and are evenly distributed in the ring direction. The spaced four reinforcing ribs 7 face the four cutting angles. The top side of the reinforcing rib 7 is connected to the top layer 3, the bottom side thereof to the under layer 4, and one lateral side thereof to the column 1.

The top layer 3 of the nut is provided with an oil groove 5' which is in communication with the screwed hole 2. The oil groove 5' is a four-side arc groove whose top end extends to the upper squared face of the nut.

EXAMPLE 3

Figure 10:
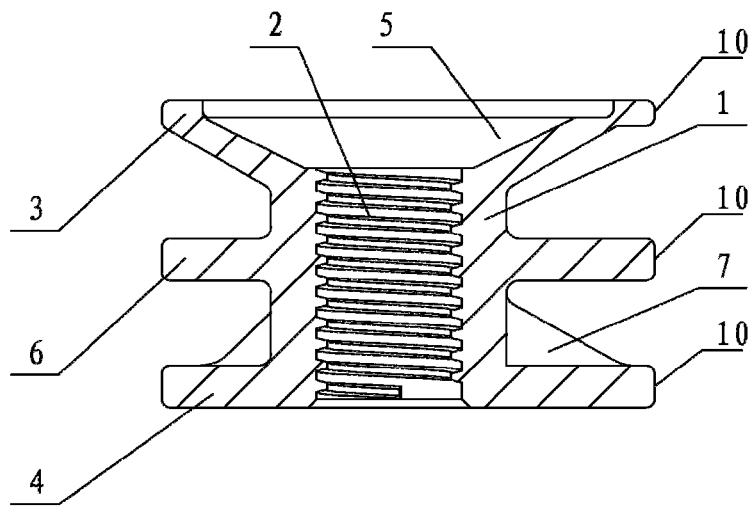
FIG. 10 is a sectional view of a third example of this invention and the cut-away direction is the A-A direction shown in FIG. 2.

With reference to FIG. 10, this example is a third one of the semi-trailer leg loading nut having substantially the same structure as Example 1 which is omitted here. The slight differences between the two examples are as below:

The nut of this example is a three-layered structure formed of a top layer 3, an intermediate layer 6 and an under layer 4. All of the three layers are square having the same cutting angle 10. The side length of the three layers of squares is the same. The projection of the outer outlines of the three layers of squares overlap with each other in the column 1 axis direction. When the screw rotates, any one of the three layers of the nut may contact the quadrate pipe. Thus, the operation of the nut is kept stable and the anti-rotating moment capability of the nut is increased. Reinforcing ribs 7 are provided between the column 1 and the under layer 4. The reinforcing ribs 7 are provided as the same in Example 1 and the details are omitted here. Having a three-layered structure, the column 1 of the nut is relatively long so that there are enough meshed threads and the column 1 does not need to extend downwards.

As a modification of this Example, the intermediate layer 6 may be smaller. It may be square with cutting angles 10 or circular or in other shapes. The projection of the outer outline of the intermediate layer 6 is within the overlapped projection of the top and under layers along the column 1 axis direction.

EXAMPLE 4

Figure 11:
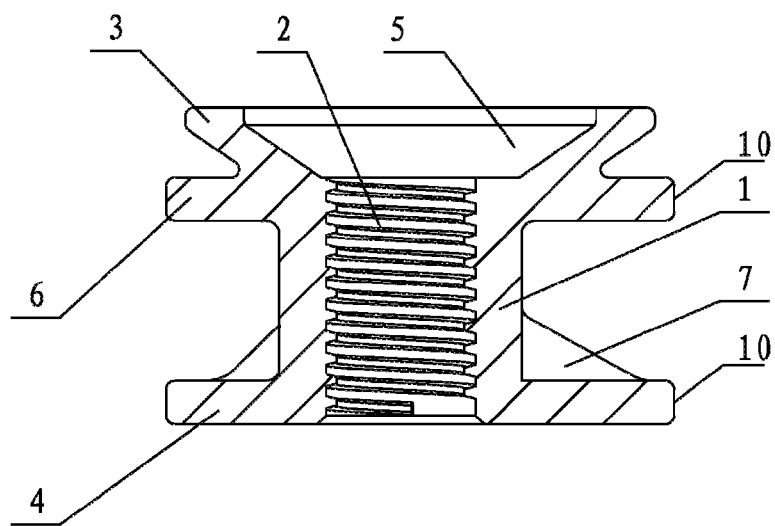
FIG. 11 is a sectional view of a fourth example of this invention and the cut-away direction is the A-A direction shown in FIG. 2.

With reference to FIG. 11, this example is a fourth one of the semi-trailer leg loading nut having substantially the same structure as Example 3 which is omitted here. The slight differences between the two examples are as below:

Although this Example is also a three-layered structure, the intermediate layer 6 and the under layer 4 are squares with the same cutting angles 10. The side length of the two layers is the same. The projection of the outer outlines of the two layers of squares overlap with each other in the column 1 axis direction. The intermediate layer 6 is adjacent to the upper end of the column threads. The top layer 3 is relatively smaller and is square having cutting angles 10 or circular or in other shapes. The projection of the outer outline of the top layer 3 is within the overlapped projection of the intermediate and under layers along the column 1 axis direction. When the screw rotates, the top layer 3 does not contact the inner wall of the quadrate pipe 8. At least five or six angles of the 8 angles of the intermediate layer 6 and the under layer 4 are in contact with the inner wall of the quadrate pipe 8 simultaneously, thereby increasing the anti-rotating moment capability of the nut.

The invention claimed is:

1. A semi-trailer leg loading nut having strength sufficient to bear the weight of a commercial vehicle, comprising: a nut column and having a screwed hole connecting two ends of the nut, wherein the nut is a three-layered structure formed of a top layer, an intermediate layer and an under layer; wherein the nut has at least two layers of outer outline which both are squares having the same cutting angle; wherein the side length of the two layers of squares is the same; wherein the projection of the outer outlines of the two layers of squares overlap with each other in a column axis direction; and wherein the projection of the outer outline of the other layer is within the overlapped projection of the two layers along the column axis direction.

2. The semi-trailer leg loading nut according to claim 1, wherein a funneled oil cup or an oil groove which is communication with the screwed hole is provided to the top layer of the nut.

3. The semi-trailer leg loading nut according to claim 1, wherein a bottom of the under layer of the nut is plane and pressed on a loading plate in a quadrate pipe to transfer load.

4. The semi-trailer leg loading nut according to claim 1, wherein reinforcing ribs are provided between the column and the under layer of the nut.

5. The semi-trailer leg loading nut according to claim 4, wherein the reinforcing ribs are triangles with one side connected to the column and the other side to the under layer.

6. The semi-trailer leg loading nut according to claim 4, wherein the reinforcing ribs are quadrilateral with a top side connected to the toper layer or the intermediate layer, a bottom side to the under layer and a lateral side to the column.

7. The semi-trailer leg loading nut according to claim 1, wherein the cutting angle is a straight cutting angle or an arc cutting angle.

\* \* \* \* \*